June 18, 1940.  G. F. LE BUS  2,204,938
CABLE AND ROPE WINDING DEVICE
Filed May 4, 1938
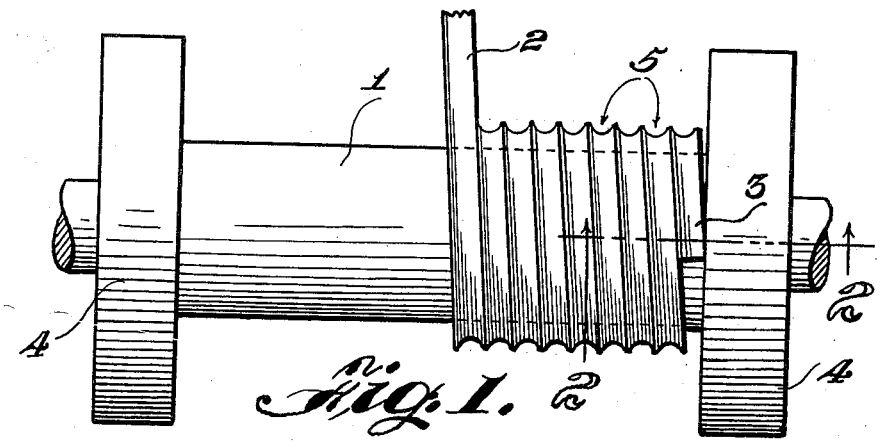
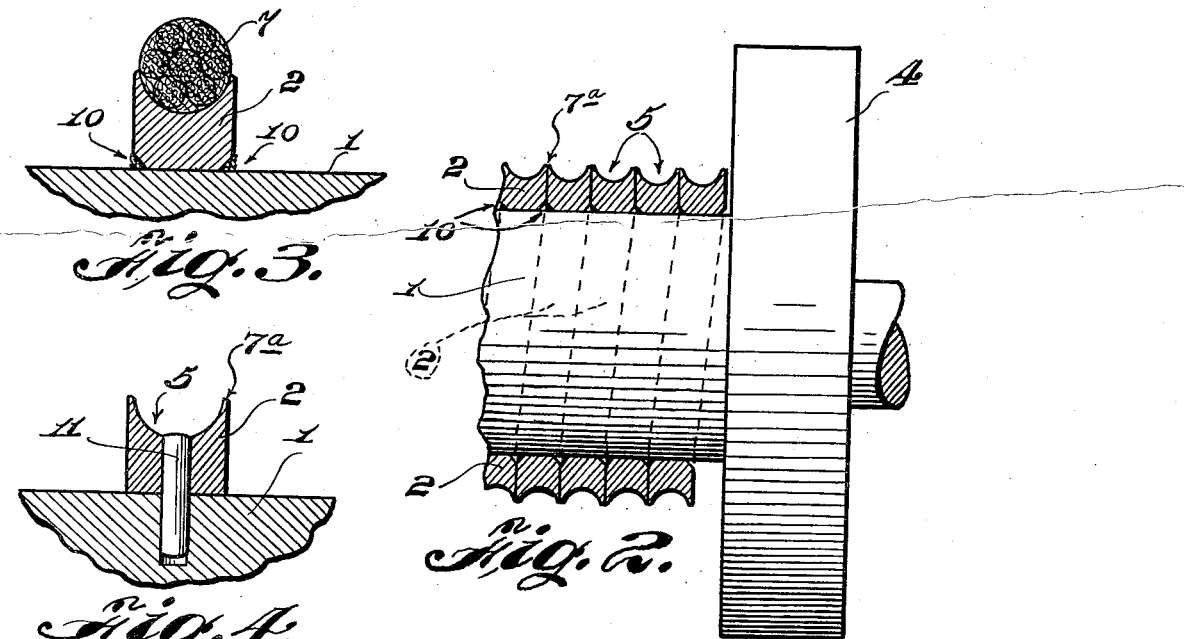
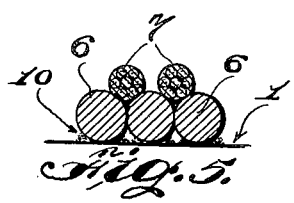
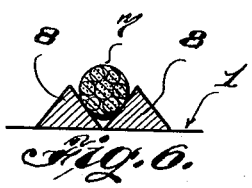
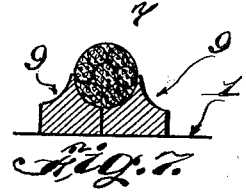
George F. Le Bus,
INVENTOR.
BY John W. Spellman
ATTORNEY.

Patented June 18, 1940

2,204,938

UNITED STATES PATENT OFFICE 2,204,938

CABLE AND ROPE WINDING DEVICE

George F. Le Bus, Longview, Tex.

Application May 4, 1938, Serial No. 206,009

4 Claims. (Cl. 242—117)

This invention relates to cable and rope winding devices and is particularly related for means for "spooling" or level winding cable, wire or rope onto a drum or spool in a true line to prevent the cable or rope from chafing.

The present mode of manufacturing a drum or spool so that a cable or rope will spool or wind in a true line onto the drum is by means of placing the drum or spool in a lathe and cutting the grooves in the drum, or by having the grooves cast in the drum by the foundry. On account of the various sizes of cables or ropes which might be used on any one certain drum, manufacturers of drums or spools hesitate to groove the drums because the size of the cables cannot be changed, as they will not spool properly if the size of the cable or rope varies from the size of the groove cast in the drum at the time it was manufactured.

Since most spools or drums are manufactured with a smooth core, the wire line or cable when winding on the drum will chafe, which shortens the life of the rope or cable; also, the rope or cable will climb and wind unevenly on the drum or spool.

The present invention involves the employment of a means or guide which may be wound upon the drum or spool or placed on the drum by rolling the latter, in either a hot or cold application of the guide means as applied to the drum. In this application of "spooling" a wire line, cable or rope, the guide means provides a spiral groove guide for any size or type of cable or rope. This guide means may be applied to a drum core either in the machine shop or otherwise, and the size of the groove may be changed as desired in keeping with the size of cable or rope to be used. Further, the guide means permits the cable or rope to be wound evenly on the drum core and at the same time it provides a small clearance between each round of cable, which prevents chafing. On the second lap of the cable or rope, the cable will follow in a true line across the spool as will each successive lap of the cable.

The preceding objects and advantages of the invention will be clearly understood from a perusal of the following detailed description, taken in connection with the accompanying drawing, and in the drawing:

Figure 1 is an elevational view of a drum core, partly broken away and illustrating a length of material wound partially around the core, and embodying the invention;

Figure 2 is an enlarged detail sectional view of Figure 1, taken along the line 2—2 thereof;

Figure 3 is a detail sectional view taken through the drum core periphery, a portion of the guide strip, with a cable seated in the groove of the guide strip;

Figure 4 is a view similar to that of Figure 3, but illustrating a modification of the means for affixing the guide strip to the drum core; and Figures 5, 6 and 7 represent sectional detail views, respectively, of modified forms of guide means, with a section of cable seated in the guide groove thereof.

Referring more in detail to the drawing, the numeral 1 denotes a drum core for supporting a cable, wire or rope to be wound thereon, and 2 a strip of material such as malleable iron or soft metal which is to be wound upon the drum core in spiral fashion as shown in Figure 1. This strip has one end 3 welded to the drum core and the strip is then wound around the core from one support 4 to the other in a single layer to properly support the cable, wire or rope to be wound on the strip.

As shown in the drawing, the strip 2 is cast or formed to provide a groove 5 which provides a surface to snugly fit the cable or rope to be wound thereon. While the rounded groove formation of the strip is the preferred form of the guide, the strip may vary to an extent to include the forms shown in Figures 5, 6 and 7. Thus in Figure 5, the guide strip may be circular in cross-section as shown at 6, one coil lying next the succeeding coil, thus providing a seat between adjacent coils for aligning and supporting a cable 7 wound thereon. In Figure 6 the guide strip as shown at 8 may be triangular in cross-section, the cable lying between the sloping side walls of the strip, while in Figure 7 the strip coils have or are so cast as to provide a longitudinal side groove 9, the two grooves on adjacent coils of the strip when lying next the other providing a snug seat for the cable 7.

The primary object of the invention being to provide a guide of this nature to prevent chafing of the wire or cable wound thereon, such preventive means in connection with the strip is carried out by the meeting or abutment of the rims of the groove as indicated at 7—a, Figure 4, since at the joint of these two or similar turns of the guide strip rims there will be a small space between the coils or turns of the wire or cable wound thereon. This small spacing of the turns of the cable provided by the width of the two abutting rims prevents chafing. This arrangement is also carried out in the modified forms in Figures 5, 6 and 7, as will be apparent.

The strip 2 of the preferred form with the groove 5 may be attached to the core 1 by welding as indicated at 10 at every turn or coil of the strip. The strip may also be secured to the core as shown in Figure 4 by the use of a pin 11, driven through the strip and into the core. The modified form of coil or strip guide shown in Figure 5, may also be welded as indicated at 10, and such means of securing the strip to the core may also be applied to the modifications shown in Figures 6 and 7.

The invention as embodied in the strip guide may, however, be further altered and changed and yet remain within the spirit of the device to an extent as might be said to fall fairly within the scope and meaning of the appended claims.

What is claimed as new is:

1. In a device of the character described including in combination a drum core, a strip of pliable metal being wound around the periphery of the said core and said strip secured to the peripheral surface of the drum core, the lateral edges of the strip being in contact, and the strip being so formed that a groove is provided for a cable to be wound therein.

2. A device of the character described including in combination a drum core, a strip of pliable metal being wound around said drum core, the lateral edges of the strip being in contact, said strip being formed with a groove on one surface thereof, so that a cable or rope can be wound in said groove, one end of said strip being fixed to said core, and the strip being affixed to the peripheral surface of said core.

3. A device of the character described comprising in combination a drum core, a strip of pliable metal spirally arranged around said core, said strip being so arranged as to provide a curved groove on each side of the strip and the lateral edges of the strip being positioned in contact whereby to provide a seat for the cable to be wound therein, and means for securing said strip to the core.

4. A cable and rope winding device comprising in combination a drum core, a strip of pliable metal spirally arranged around the periphery of said drum core, said strip being circular in cross section and with the lateral edges of the strip being positioned in contact whereby to provide a seat for a cable to be wound therein, and means for securing said strip to the peripheral surface of said drum core.

GEORGE F. LE BUS.